US008731737B2

(12) United States Patent
Streichert et al.

(10) Patent No.: US 8,731,737 B2
(45) Date of Patent: May 20, 2014

(54) MICROCONTROLLER HAVING A COMPUTING UNIT AND A LOGIC CIRCUIT, AND METHOD FOR CARRYING OUT COMPUTATIONS BY A MICROCONTROLLER FOR A REGULATION OR A CONTROL IN A VEHICLE

(75) Inventors: Felix Streichert, Stuttgart (DE); Tobias Lang, Kirchberg (DE); Heiner Markert, Stuttgart (DE); Axel Aue, Korntal-Muenchingen (DE); Thomas Kruse, Stuttgart (DE); Udo Schulz, Vaihingen/Enz (DE); Thomas Richardsen, Gerlingen (DE); Michael Saetzler, Stuttgart (DE); Ulrich Schulmeister, Bietigheim-Bissingen (DE); Nico Bannow, Stuttgart (DE); Holger Ulmer, Ulm (DE); Matthias Schreiber, Stuttgart-Feuerbach (DE)

(73) Assignee: Robert Bosch GmbH, Stuttgart (DE)

( * ) Notice: Subject to any disclaimer, the term of this patent is extended or adjusted under 35 U.S.C. 154(b) by 272 days.

(21) Appl. No.: 13/093,421

(22) Filed: Apr. 25, 2011

(65) Prior Publication Data

US 2011/0282517 A1 Nov. 17, 2011

(30) Foreign Application Priority Data

Apr. 27, 2010 (DE) ........................ 10 2010 028 259

(51) Int. Cl.
*G06F 19/00* (2011.01)
*G06F 7/00* (2006.01)

(52) U.S. Cl.
USPC ................................ 701/1; 701/30.2; 703/14

(58) Field of Classification Search
USPC ........ 701/1, 102, 104, 36, 30.2, 32.9; 703/14; 706/12
See application file for complete search history.

(56) References Cited

U.S. PATENT DOCUMENTS

| | | | | | |
|---|---|---|---|---|---|
| 4,881,172 | A * | 11/1989 | Miller | ............................. | 701/37 |
| 6,076,030 | A * | 6/2000 | Rowe | ............................. | 701/50 |
| 6,671,611 | B1 * | 12/2003 | Peltier | ............................. | 701/104 |
| 6,862,514 | B2 * | 3/2005 | Ehara | ............................. | 701/102 |
| 2003/0204292 | A1 * | 10/2003 | Wang et al. | ..................... | 701/36 |
| 2005/0154519 | A1 * | 7/2005 | Kim | ............................. | 701/51 |
| 2005/0252283 | A1 | 11/2005 | Heap et al. | | |
| 2008/0162386 | A1 * | 7/2008 | Rifkin et al. | .................... | 706/12 |
| 2011/0264353 | A1 * | 10/2011 | Atkinson et al. | .............. | 701/102 |

FOREIGN PATENT DOCUMENTS

| | | |
|---|---|---|
| DE | 102005022247 | 5/2006 |
| WO | WO 03050624 | 12/2002 |

* cited by examiner

*Primary Examiner* — Tan Q Nguyen
(74) *Attorney, Agent, or Firm* — Kenyon & Kenyon LLP

(57) ABSTRACT

A microcontroller having a computing unit and a logic circuit. The microcontroller carries out computations for a regulation or control in a vehicle. The computing unit is connected to the logic circuit, and the logic circuit has an arrangement for computing an exponential function and is configurable.

17 Claims, 1 Drawing Sheet

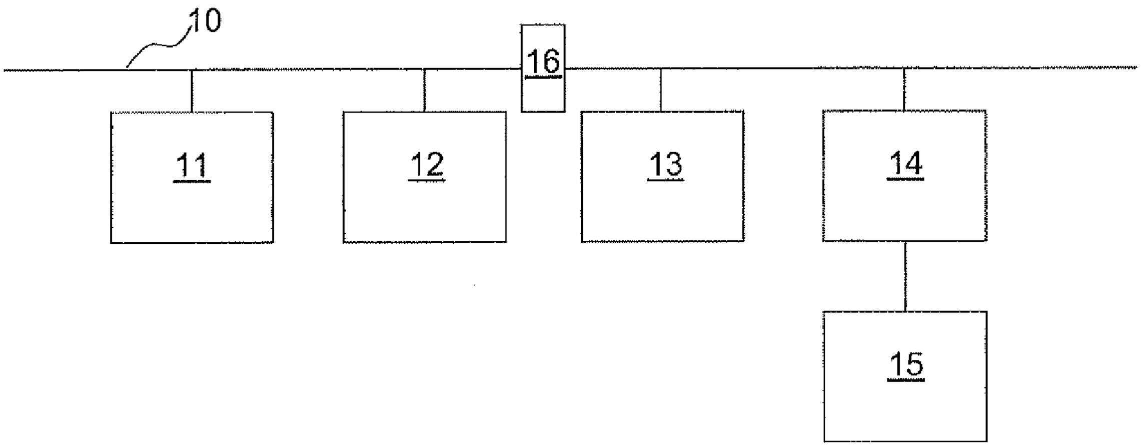
10
16
11
12
13
14
15

MICROCONTROLLER HAVING A COMPUTING UNIT AND A LOGIC CIRCUIT, AND METHOD FOR CARRYING OUT COMPUTATIONS BY A MICROCONTROLLER FOR A REGULATION OR A CONTROL IN A VEHICLE

CROSS REFERENCE

The present application claims the benefit under 35 U.S.C. §119 of German Patent Application No. 102010028259.6, filed on Apr. 27, 2010, which is expressly incorporated herein by reference in its entirety.

FIELD OF THE INVENTION

The present invention is directed to a microcontroller having a computing unit and a logic circuit, and to a method for carrying out computations by a microcontroller for a regulation or a control in a vehicle.

BACKGROUND INFORMATION

Computationally intensive mathematical problems in control units in the automotive sector may be solved in various ways. Standard processors are not generally usable in the embedded region. Factors such as high costs, limited temperature range, poor predictability, and safety requirements preclude such use. Therefore, specialized microcontrollers are used in the embedded region. Computation on these microcontrollers is much slower, since as a rule the clock frequency is lower, fewer caches are available, the pipeline stages do not implement high parallelization, no speculative computations are performed, etc. For this reason, multicore computing units or additional digital signal processors (DSP) are used in the embedded region in the case of high computing requirements. A multicore system for use in the automotive sector is described in European Patent No. EP-1456720. A system controller in the automotive sector, having a digital signal processor, is described in German Patent Application No. DE-102005022247.

SUMMARY

An example logic circuit of the microcontroller proposed herein is able to carry out computations in the microcontroller by providing computed exponential functions, thus allowing quicker, more advantageous (from the standpoint of costs and space requirements), more energy-efficient, and more reliable computations of tasks of the microcontroller, for which the computation of exponential functions represents a subtask. One particular advantage is that by transferring the exponential function computations to the logic circuit, the computing unit of the microcontroller is relieved of computations and access operations. Due to the option for configuring the logic circuit, particularly flexible but more efficient computation support is achieved.

Since the logic circuit is present as a separate hardware component outside the processor, there are no direct dependencies on the processor. Mutual influences on the execution speed of the further processor functions are thus avoided. The execution of the software is not directly influenced. Despite the limited functionality, the implemented functionality may still be used in a very flexible manner, and for this purpose is controlled by a software processor.

In addition, hard real-time requirements in the embedded region may also be met using this approach.

The logic circuit may be used in the microcontroller in a particularly flexible manner when the logic circuit is configurable, for example is able to read configuration data from a configuration data memory for the purpose of configuring the logic circuit. Such data may relate to which exponential function is to be computed, i.e., may relate to the free parameters or constants of the exponential function, for example. It may also be specified that the logic circuit computes exponential functions of sums, and it may be provided that the number of summands to be added is configurable. In addition, the summation of various exponential functions may be provided, the parameters and the number of exponential functions to be summed being configurable for each of the exponential functions to be summed. Furthermore, the configuration may also relate to the type of computation of the exponential function, for example if various computation paths are possible via the logic circuit, or if a parallelization of computations, for example, is possible within the logic circuit. Optionally, the logic circuit may also compute the values themselves which are to be summed, and which are formed by computing an internal term.

The configuration data may advantageously be generated by the microcontroller or by a computing unit of the microcontroller, preferably as a function of the task to be computed or as a function of certain vehicle information, and may be written in a configuration data memory to which the logic circuit has access. The logic circuit may thus be flexibly adapted to the tasks to be computed, as well as to other conditions.

For efficient implementation of the configuration, the logic circuit may have a connected (local) memory in which the configuration data are stored.

If the use of a local memory is to be eliminated, it may also be advantageous to store the configuration data in a global memory to which the logic circuit may have direct memory access (DMA), for example, in order to allow a rapid and reliable configuration in this approach as well.

The proposed microcontroller may be used in a particularly advantageous manner to compute output variables using Bayesian regression, based on input variables and training values, the exponential function computations required for the Bayesian regression being performed by the specialized logic circuit. The microcontroller thus allows more efficient and accurate control of vehicle functions, with a particularly efficient design of the microcontroller.

BRIEF DESCRIPTION OF THE DRAWINGS

Exemplary embodiments of the present invention are illustrated in the figures and explained in greater detail below.

FIG. 1 schematically shows components of a microcontroller and their connection.

DETAILED DESCRIPTION OF EXAMPLE EMBODIMENTS

In the description of the example embodiment of the present invention, a logic circuit refers to a pure, in particular hard-wired, logic circuit which does not have a processor that executes software.

FIG. 1 schematically shows components of a microcontroller and their connection. A computing unit or a processor core 11 of a computing unit, a first global memory unit 12, a second global memory unit 13, and a logic circuit 14 are each connected to communication connection 10, and are able to communicate with one another via the communication connection. Communication connection 10 may be provided as a bus system, for example, and in FIG. 1 communication connection 10 is subdivided into two separate buses with the aid of a bus bridge 16, for example. Logic circuit 14 may be connected to a local memory unit 15.

Global memory units 12 and 13 may be designed as RAM or flash memory, for example. Providing two global memories in FIG. 1 is an optional embodiment. Local memory 15 may be provided as RAM memory, for example, or as a register, and is preferably visible in the global address range. Bus bridge 16 shown in FIG. 1 is optional. As discussed in greater detail in the following description, in one particular execution of the present invention, local memory 15 may also be dispensed with. The components of the microcontroller shown in FIG. 1 are understood to be nonexhaustive, and in particular other processor cores or completely different architectures may be provided.

Circuit system 14 is designed to compute an exponential function, or, since it is configurable, to compute various exponential functions and optionally the sum of exponential functions. The circuit system represents an automatic state machine which retrieves input data for the computation from an input memory, and in the course of the computation computes an exponential function, and optionally via a sequence control in communication with the computing unit or with processor core 11 of the microcontroller computes the sum of exponential functions in the required loop operations, and is thus used, in a manner of speaking, as a hardware accelerator in carrying out complex tasks of the microcontroller or computations of processor core 11. Logic circuit 14 is present as a separate hardware component outside the processor.

Many implementations of the computation of exponential functions in hardware circuits are known. For example, a BKM (Bajard, Kla, Muller) algorithm, a CORDIC algorithm, or conventional expansion series may be used for approximating exponential functions. Other methods which approximately simulate an exponential function are also possible.

One technology used in the automotive sector for regulating and controlling systems is the representation of system-specific properties with the aid of characteristic maps. The characteristic map data represent the approximate mapping of the specific system behavior. During operation the data are directly used or evaluated by interpolation, for example to determine a working point, or, for example, to deduce unknown parameters from known states and parameters. Complex characteristic maps often have multiple dimensions. The data points of the characteristic map are characterized by a predefined quantity of data. The data points are computed offline, i.e., at the time of calibration, and are permanently stored, for example in the flash memory of the microprocessor, upon delivery of the control unit.

The shortcoming of the characteristic map approach is that the number of data points increases disproportionately as the number of dimensions increases. Since these data points consume correspondingly more memory, this approach is not cost-effective. In addition, values between data points must be interpolated. The number and complexity of interpolations increase with an increasing number of dimensions. Reading out the data points from the memory and interpolation are time- and computation-intensive. In particular, access to the characteristic maps which are situated in the flash memory, for example, which is usually not predictable and therefore not bufferable, results in long waiting times for the processor in the range of multiple cycles for each read access. This time is generally not usable in some other way, so that considerable computing power is wasted. In addition, the interpolation and the limited number of data points are accompanied by a loss in accuracy, which in turn is reflected in decreased regulation or control accuracy.

In this regard, the example logic circuit as a hardware accelerator of exponential function computations for a control unit-computing unit allows, for example, use of methods, which heretofore have not been feasible due to limited computing resources, for determining unknown parameters as a function of known (measured and/or computed, for example) parameters for controlling vehicle functions, and allows use of the parameters in real time by a control unit.

As an example of such, nonparametric regression methods such as Bayesian regression are mentioned in one particularly advantageous embodiment. Bayesian regression methods, for example kriging, Gaussian processes, sparse Gaussian processes, etc., may be used on the control unit for predicting, for example, engine-relevant parameters (for example, combustion variables, air feed system variables, etc.) for the control and/or regulation. A portion of the computation of the Bayesian regression methods, in particular computation of exponential functions or computing steps for computing exponential functions, is transferred to the logic circuit.

Compared to the conventional methods, such Bayesian regression models provide more accurate results and may be used in a more flexible manner. Bayesian regression models are able to easily map high-dimensional, nonlinear relationships without prior knowledge and without parameterization, based solely on training data. These are black box models. Simply stated, the best random functions are averaged for determining the needed parameters, from a large number of ascertained random functions based on deviations of certain input variables from training values measured offline before the control unit is used. In this simplified picture, the accuracy of the method corresponds to the deviation of the averaged best functions from one another. Thus, in contrast to the conventional methods, in addition to the model prediction, the Bayesian regression models are also able to provide conclusions concerning model variance (model uncertainty).

In the case of such a use of the microcontroller or the logic circuit, the control unit receives signals from an external control unit, for example from sensors or other control units, computing units, or other modules. In this case these variables are referred to as input variables, and may represent temperature signals, rotational speed signals, quantity signals, etc. Values which have been determined in test measurements for certain variables offline, i.e., before the control unit or the vehicle is operated, and stored in the memory unit, are stored in a memory unit. Here and in the following description, these values are referred to as training values. The terms “offline” or “before operation” specify a phase in which the control unit is not used for real-time regulation and control tasks during normal operation of the vehicle (“online”, “in operation”), but instead, in which vehicle functions which are relevant for the control unit are tested, calibrated, and determined, for example in a calibration of the control unit in the facilities of an automotive supplier or automobile manufacturer, in a repair shop, or in a test operation.

Parameters and variables which have been received or computed by the control unit, and which are likewise included in the input variables, may also be stored in the memory. Independently or in conjunction with the computing unit of the control program, the logic circuit determines one or multiple output variables for meeting the control or regulation functions of the control unit. Output variables refer to variables or intermediate values which are necessary for the control/regulation, are not directly measurable or determinable in the vehicle except with great effort, and which therefore are determined from the available input variables. For this purpose, during operation the control unit carries out a Bayesian regression using the training data stored in the memory which are relevant for the output variable to be determined, taking into account the input variables which are relevant for the output variable to be determined. For this purpose, the computing unit may process the algorithms necessary for carrying out the regression partly in software; however, certain computing steps which involve the computation of exponential functions are transferred to the specialized logic circuit. The determined output variable or a control or regulation signal which is thus determined is output via an output of the control unit to an actuator, for example, or is entered as an intermediate value in further computations.

The fundamentals of Bayesian regression are described in Gaussian Processes for Machine Learning, C. E. Rasmusen and C. Williams, MIT Press, 2006. For the use of such regression methods, the basic formula for computing a certain prediction of a necessary parameter as a function of known parameters in the control unit in real time, i.e., during operation of the control unit, for controlling vehicle functions includes the computation of exponential functions, in particular for the methods which use the so-called squared exponential kernel. Such methods or comparable methods may be used in a particularly efficient manner in motor vehicle control units due to the proposed transfer of certain computing operations with regard to the computation of exponential functions to logic circuit 14. For such nonparametric methods, the following formula, for example, may be mentioned as a particularly relevant example of the exponential functions to be computed or the exponential functions whose computation is to be accelerated, without limiting the present invention to formulas of this type:

$$\text{result} = C1 * e^{\sum_{i=1}^{N}\left(C2_i\left(\left(C3_i - \frac{C4_i}{C5_i}\right)^{C6_i}\right)\right)}$$

The formula is characterized by the exponential function e( ) having an internal term. The internal term normalizes input variables C4 by dividing by C5, and computes the difference from the training values or specific characteristic values by subtracting from C3. The intermediate result is then exponentiated by C6, multiplied by a weighting factor C2, and added to form a sum. The function e( ) is then applied to this sum result (internal term). The result may be weighted by multiplying by C1. Typically, C6=2 and C2=1.

Thus, the exponential function of a sum of N summands is computed, corresponding to the dimension of the input variable. Values C1-C6 as well as the run indices of the summation (starting value of the sum, number of summands, end value of the sum) may be provided to be configurable.

Alternatively, it is possible to configure only a portion of these parameters, and to predefine other parameters.

The exponential function to be computed may be calculated completely in the logic circuit, with or without an internal term, subcomputations may be performed elsewhere, and the exponential function may also be part of a larger formula which the logic circuit computes. Furthermore, the logic circuit may be designed in such a way that, in addition to an exponential function computation, it is able to carry out other computations, which may be performed in parallel with or instead of the exponential function computation. The logic circuit may internally parallelize the execution of the algorithms as desired. Externally, it is necessary only to ensure consistency, or to externally signal inconsistent states using suitable means.

Optionally, the logic circuit may compute more than one of the formulas or tasks simultaneously without influencing the individual results with respect to one another. This may be implemented using parallel arithmetic units, or sequentially on one arithmetic unit. In order to differentiate among the formula instances, the configuration parameters for each of the formulas are known to the hardware accelerator. For this purpose, it is advantageously possible to switch between the configuration sets, i.e., to have separate access to individual configuration sets, and to reuse portions of configuration sets of a formula or task in another formula or task.

Optionally, the logic circuit may be designed to be executed periodically. All or part of the configuration data should be updated by interaction with the software processor, and optionally other involved hardware components, before each execution is restarted.

The present invention may be supplemented by the optional possibility of accumulating multiple computed results, for example by executing an external loop. For this purpose, the hardware accelerator may be configured so that the individual results (i.e., parameters or configuration data) to be accumulated are to be selectively adjusted for the different individual tasks.

As shown in FIG. 1, logic circuit 14 is not integrated into processor core 11, but instead acts independently, and thus without directly influencing processor core 11. The logic circuit interacts with the software of processor 11. Thus, there is communication between processor 11 and the logic circuit which allows the correct computation, i.e., using the correct parameters, starts (or also stops) the logic circuit at the desired time, and ensures correct transfer of the results.

The communication between processor 11, logic circuit 14, and memories 12 and 13 may take place via common bus 10, as shown in FIG. 1, via data paths which are decoupled from one another, such as a bus bridge or a crossbar or by direct connection or other features. Optionally, the use of configurable communication and synchronization mechanisms, such as the sending of interrupts among the involved components software processor 11, logic circuit 14, and optionally other involved components, is also possible.

During run time, logic circuit 14 may be dynamically configured by the processor with regard to:

- number of loops; i.e., in the case of an exponential function of an integer value, for example, how many summands the sum has, or, in the case of a number of exponential functions or a sum of multiple exponential functions, how often exponential functions are to be performed in succession;
- constants; the constants or parameters may be set depending on the task, or as a function of vehicle functions and states;
- special instructions for computing the formula; i.e., how the computation is to be performed;
- optionally, the manner of interaction with the processor;
- optionally, information concerning further computations to be executed.

The configuration data may optionally be contiguously combined as one or multiple clusters in a specified manner. The type of access to each configuration cluster must be known to logic circuit 14. Logic circuit 14 may optionally be configured during run time with respect to location and access to the cluster. It is possible to store the configuration data, for example, only in a local memory 15, only in one of global memory units 12 and 13, or between these memory components in a distributed manner. For example, if configuration data are completely or partially stored in one or multiple global memories 12 and 13, logic circuit 14 is able to access the globally visible memory range, i.e., these global memories, in particular via direct memory access (DMA).

Optionally, for reasons of access optimization, the constants of the formulas or task may be indexed in such a way that, with respect to time, linear or approximately linear access to constants of an array is achieved. The same applies for the execution of multiple formulas, whose configuration data are then ideally stored linearly in succession.

In a departure from the dynamic configurability, it is possible as mentioned to directly specify individual values in the hardware accelerator. It is also possible to permanently or configurably specify alternative values, from which the previously described configuration may be indirectly deduced.

Logic circuit 14 is dynamically configured by the writing of configuration registers or a configuration memory by the remaining system components, in particular using the software which is executed on processor 11.

Optionally, the configuration may be performed using a direct memory access (DMA) controller, which in turn may be controlled by the software of the processor. A configuration by other components of the overall system is also possible.

As described, logic circuit 14 may optionally have a local memory or a local register set from which it obtains the configuration. If logic circuit 14 has such a local memory or a local register set 15, the local memory or local register set should optionally be globally visible, i.e., should be located in the global address range. If necessary, the contents may be modified by further components such as the software processor. In addition to configuration of the hardware accelerator, the procedure also allows use of memory 15 for other uses when memory 15 is not needed, or is not completely needed, by logic circuit 14 for the computation. The logic circuit may have internal optimization measures which convert a precalculation or a preloading of data, or which maintain the results or intermediate results in a buffer or a pipeline. To achieve high flexibility, in each case the logic circuit optionally may have the capabilities of interruptibility, storage of intermediate values, resumption of computations, switching to the computation of the same formula having different configuration parameters, and other optimization measures. Upon interruption, all relevant information should be stored and optionally made readable in order to allow resumption of the computation immediately or at a later point in time. It is acceptable to discard a negligibly small portion of a computation which has already been performed ("negligible" in the sense that the computing time has no influence on the execution in interaction with the other system components).

The starting of the computation by the logic circuit may be initiated by any other system components, in particular by the software processor.

What is claimed is:

1. A microcontroller adapted to carry out computations for regulation or control of a vehicle, the microcontroller comprising:

a computing unit that includes a processor; and a configurable logic circuit that is connected to the computing unit, includes a hardware arrangement that is hard-wired to compute an exponential function, and is configured to provide a result of the computation to the computing unit, wherein the processor of the computing unit executes software to perform the computations for the regulation and control based on the result from the logic circuit.

2. The microcontroller as recited in claim 1, wherein the logic circuit is configurable with regard to configurable parameters of the exponential function.

3. The microcontroller as recited in claim 1, wherein the logic circuit is configurable with regard to a number of computations of exponential functions.

4. The microcontroller as recited in claim 1, wherein the logic circuit includes an arrangement to sum results of multiple computed exponential functions.

5. The microcontroller as recited in claim 1, wherein the logic circuit is configurable with regard to a type of computation of the exponential function.

6. The microcontroller as recited in claim 1, wherein for configuration, the logic circuit accesses configuration data in a configuration data memory.

7. The microcontroller as recited in claim 6, wherein the microcontroller includes an arrangement to generate the configuration data for the logic circuit and for writing the configuration data in the configuration data memory as a function of computations to be performed.

8. The microcontroller as recited in claim 7, wherein the microcontroller includes an arrangement to write the configuration data in the configuration data memory via direct memory access.

9. The microcontroller as recited in claim 6, wherein the configuration data are stored in a local memory which is connected to the logic circuit.

10. The microcontroller as recited in claim 6, wherein the configuration data are stored in a global memory which the logic circuit is able to access via direct memory access.

11. The microcontroller as recited in claim 1, wherein the processor is configured to compute, during operation of the vehicle, at least one output variable for controlling functions of the vehicle based on at least one input variable which is ascertained during operation, and to carry out the computation of the output variable using a Bayesian regression of training values which are ascertained for the output variable and the input variable before operation, and the logic circuit computes computing steps of the Bayesian regression which include exponential functions.

12. The microcontroller as recited in claim 1, wherein:

the configurable logic circuit is configurable on a hardware level based on configuration data; and during a processing procedure by the computing unit, the microcontroller is adapted for control to be given to the configurable logic circuit for performance of the exponential function to generate the result.

13. The microcontroller as recited in claim 12, wherein the configuration data dictates which parameters to use for the exponential function.

14. A method for carrying out computations by a microcontroller for regulation or control in a vehicle, the microcontroller including a computing unit and a logic circuit, the method comprising:

configuring the logic circuit by the computing unit;

computing, by the logic circuit, exponential functions by executing a hardwired program of the logic circuit;

providing, by the logic circuit and to the computing unit, a result of the exponential functions; and executing, by a processor of the computing unit, software to perform the computations for regulation and control based on the result.

15. The method as recited in claim 14, wherein at least one output variable for controlling functions of the vehicle is computed during operation of the vehicle on the basis of at least one input variable which is ascertained during operation, the computation of the output variable is performed using a Bayesian regression using training values which are ascertained for the output variable and the input variable before operation, and computing steps of the Bayesian regression, which include exponential functions, are computed by the logic circuit.

16. The method as recited in claim 14, wherein:

the configuration of the logic circuit is on a hardware level using configuration data; and the computing of the exponential function by the logic circuit is in accordance with the configuration.

17. The method as recited in claim 14, further comprising:

summing, by the logic circuit, results of multiple computed exponential functions.

* * * * *